United States Patent
Zhang

(10) Patent No.: US 7,023,847 B2
(45) Date of Patent: Apr. 4, 2006

(54) NETWORK ADDRESS TRANSLATION BASED MOBILITY MANAGEMENT

(75) Inventor: Junbiao Zhang, Bridgewater, NJ (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 10/342,972

(22) Filed: Jan. 15, 2003

(65) Prior Publication Data
US 2004/0203760 A1  Oct. 14, 2004

(51) Int. Cl.
*H04L 12/28* (2006.01)
(52) U.S. Cl. .............. 370/389; 370/392; 709/238
(58) Field of Classification Search ............. 370/389, 370/392, 331, 352, 338; 709/238, 245
See application file for complete search history.

(56) References Cited

U.S. PATENT DOCUMENTS

| 6,515,974 B1* | 2/2003 | Inoue et al. | 370/331 |
| 6,697,354 B1* | 2/2004 | Borella et al. | 370/352 |
| 2001/0036184 A1* | 11/2001 | Kinoshita et al. | 370/389 |
| 2002/0191576 A1* | 12/2002 | Inoue et al. | 370/338 |
| 2003/0193921 A1* | 10/2003 | Kim | 370/338 |
| 2003/0219000 A1* | 11/2003 | Magret et al. | 370/338 |

OTHER PUBLICATIONS

K. Daniel Wong, et al., *Performance of IP Micro-Mobility Management Schemes Using Host Based Routing.*
Network Working Group, P. Calhoun, *Mobile IP Network Access Identifier Extension for Ipv4*, Mar. 2000, pp. 1-9.

* cited by examiner

Primary Examiner—Seema S. Rao
Assistant Examiner—Robert C. Scheibel, Jr.
(74) Attorney, Agent, or Firm—Joseph S. Tripoli; Ronald H. Kurdyla; Joel M. Fogelson

(57) ABSTRACT

There is provided a method for supporting a mobile host in a communication structure having a home agent. The mobile host is enabled to communicate with a Network Address Translation (NAT) server. A packet for the mobile host, incorporating data that includes at least an address and a port used on the mobile host, is translated by the home agent into a global address and a port used on the NAT server, respectively. The packet is sent from the home agent for modification so that the packet can be routed to the mobile host. The packet is compatible with the NAT server.

20 Claims, 4 Drawing Sheets

US 7,023,847 B2

NETWORK ADDRESS TRANSLATION BASED MOBILITY MANAGEMENT

FIELD OF THE INVENTION

The present invention generally relates to mobility management and, more particularly, to Network Address Translation (NAT) based mobility management of resources accessed by their respective network address.

BACKGROUND OF THE INVENTION

Mobile Internet Protocol (IP) is a mobile-based standard for transmitting information via the internet; see "Mobile IP Network Access Identifier Extension for IPv4", September 2000 (IETF RFC 2794). One problem with mobile IP is that it requires an address such as a mobile care-of-address for a mobile resource to be reachable globally. This is difficult because most networks make use of Network Address Translation (NAT) that assigns an IP address for the use of multiple mobile devices that typically communicate through a single access point, that corresponds to the given IP address. Another problem with mobile IP is that the protocol overhead is high, especially for small packets, because mobile IP uses tunneling procedures to communicate data. Common tunneling techniques include, for example, IP-in-IP or IP-in-User Datagram Protocol (UDP)-in-IP.

With respect to the first problem described above, the use of UDP has been suggested as a work around of NAT, i.e. tunneling IP packets from a home agent using UDP packets. That is, a Mobile Terminal (MT) first registers with its home agent using UDP, creating a mapping in a corresponding foreign network NAT server. This approach of using IP tunneling requires a significant amount of protocol bandwidth in order to operate. Also, the MT has to keep the UDP mapping alive at the foreign NAT server by constantly sending registration messages to the home agent of the MT.

Accordingly, it would be desirable and highly advantageous to have a method and system for mobility management that overcomes the above-described problems of the prior art.

SUMMARY OF THE INVENTION

A method and an apparatus are disclosed for supporting a mobile host in a communication structure having a NAT server and a home agent. The NAT server corresponds to a foreign network with respect to the mobile host and the home agent. In a data packet for the mobile host, the home agent translates at least one of an Internet protocol compliant address on the mobile host and a port on the mobile host to a global address on the NAT server and a port on the NAT server, respectively. The data packet is sent from the home agent to the NAT server to modify at least one address (global) on the NAT server and a port on the NAT server, so that the data packet can be routed to the mobile host.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a method and system for Network Address Translation (NAT) based management for IP based mobile devices. NAT servers are utilized for addressing the problem with IPv4 address space shortage, as there is a limit to the total number of unique IPv4 based addresses. This limitation also creates many problems for various Internet protocols. The present invention takes advantage of the existing NAT based architectures by using NAT for Internet based mobility support, in contrast to working around NAT.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. In accordance with the principles of the present invention, one of ordinary skill in the related art will be able to contemplate these and similar implementations or configurations of the present invention.

Figure 1:
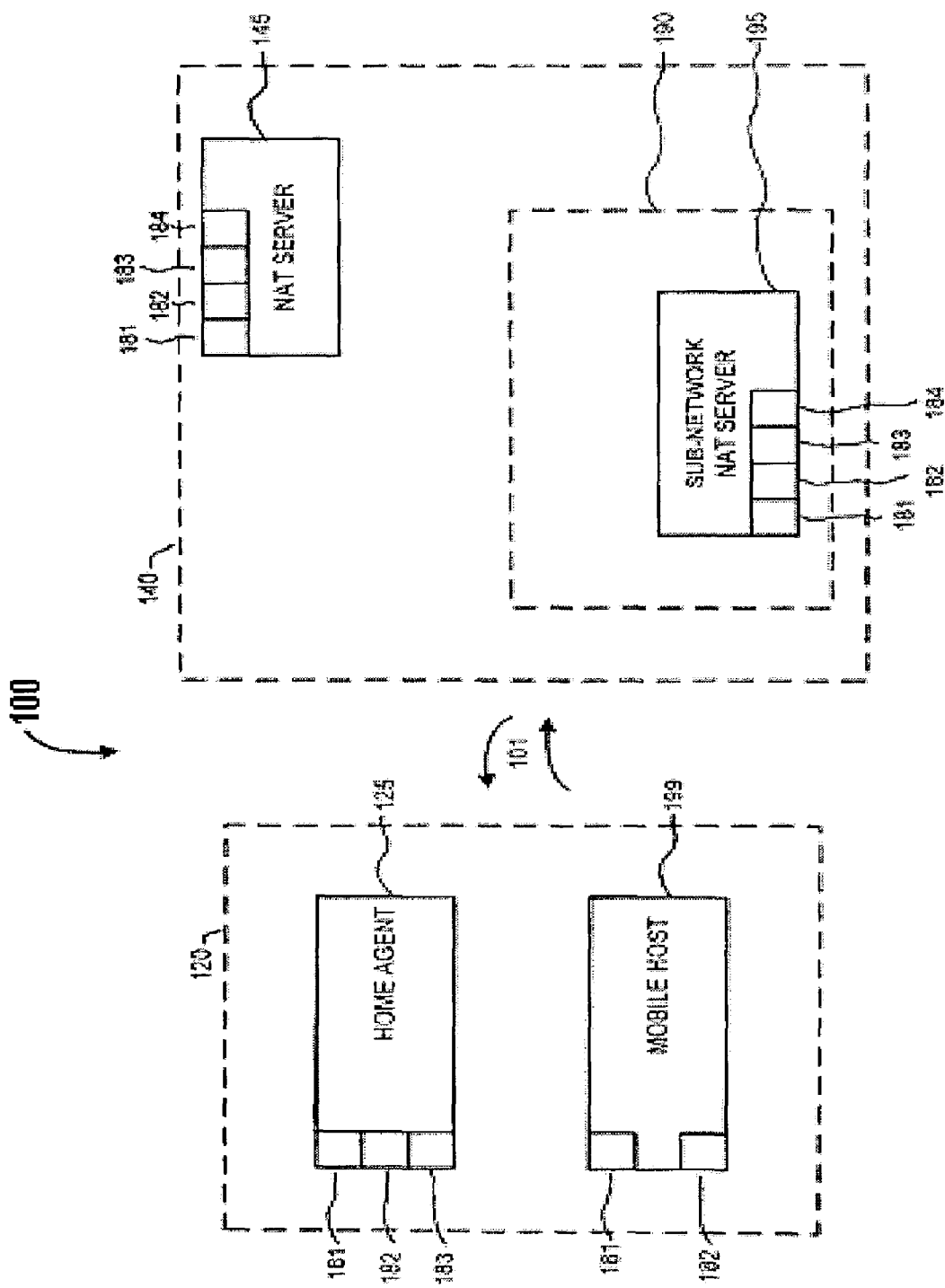
FIG. 1 is a block diagram illustrating a communication structure 100, according to an illustrative embodiment of the present invention.

FIG. 1 is a block diagram illustrating a communication structure 100, according to an illustrative embodiment of the present invention. The communication structure 100 includes a home agent 125, a mobile host 199, and a Network Address Translation (NAT) server 145 (also referred to herein as "parent NAT server" 145). Home agent 125 belongs to a first network 120 and NAT server 145 belongs to foreign network 140. Foreign network 140 further includes sub-network 190 that, in turn, includes sub-network NAT server 195 (also referred to herein as "child NAT server" 195), the latter being described in further detail with respect to FIG. 4 below.

Home agent 125, mobile host 199, NAT server 145, and sub-network NAT server 195 each include both transmitter 181 and receiver 182, in this embodiment of the invention. It is to be appreciated that the elements of communication structure 100 are not limited to the preceding communication devices and, thus, any type of communication device may be employed with the present invention while maintaining the spirit and scope thereof. Home agent 125, NAT server 145, and sub-network NAT server 195 each include translator 183. NAT server 145 and sub-network NAT server 195 each include map generator 184.

Mobile host 199 may be, but is not limited to, mobile phones, personal digital assistants (PDA's), laptop computers, or any type of device utilizing a wireless interface to communicate information. It is to be appreciated the mobile host 199 may be any type of mobile device that is also capable of communicating via a wired connection As an example, the mobile device would remain stationary while connected to a network, complete its communications with that network, and then be carried to another location where the process of connection and disconnection are repeated to communicate with the same or a different network, i.e., a PDA capable of docking to a communications network.

Home agent 125 may be any type of device found in a network that is capable of executing software. Thus, home agent 125 may be, but is not limited to, a server, computer, mobile device receiver, and the like.

First network 120 and foreign network 140 may be any combination of networks including wireless networks (e.g., Wireless Local Area Network, third generation (3G) Universal Mobile Telecommunications System (UMTS), GSM based networks, GRPS based networks, wired networks as twisted pair, Ethernet, PSTN, and the like.

While RF based signals 101 are shown as the medium of communication between first network 120 and foreign network 140, any type of communication medium or fabric may be used. A communication medium may also incorporate wired and wireless components between devices. The requirements of the communication medium are dependent on the type of networks and devices being networked. In the illustrative embodiment below, user registration messages, address translation messages, and user data messages are the types of messages exchanged between first network 120 and foreign network 140, in the form of data packets wirelessly. However, the present invention is not limited to only these types of messages and other types of messages utilizing other interface means (wired or wireless) may be employed in accordance with the present invention as readily determined by one of ordinary skill in the related art.

The illustrative embodiment below references the use of ports. It is to be appreciated that any type of ports may be used to implement the present invention including, but not limited to ports used for applications such as, File Transfer Protocol (FTP), Hyper Text Transfer Protocol (HTTP), Simple Mail Transfer Protocol (SMTP), Transmission Control Protocol/Internet Protocol (TCP/IP), User Datagram Protocol (UDP), and Packet Data Convergence Protocol (PDCP) where a client binds to a host via a port. It is to be further appreciated that any range of ports may be employed in accordance with the present invention. In a preferred embodiment of the present invention, any where from 1000 to 2000 ports may be used, each port to be used by a client for purposes of binding to a host, however, more or less ports may also be used depending on the needs of devices using the principles of this invention.

It is to be appreciated that the present invention is not limited to communication architecture exactly as shown in FIG. 1 and, thus, other architectures as readily contemplated by one of ordinary skill in the related art may also be employed with the present invention. That is, given the teachings of the present invention provided herein, one of ordinary skill in the related art will contemplate these and various other variations and implementations of a communication structure for use with the present invention while maintaining the spirit and scope of the present invention.

It is to be appreciated that the phrases "mobile terminals" and "mobile hosts" are used interchangeably herein. Further, as used herein, "G" represents the global address reserved by the NAT server 145 for mobility handling, "H" represents the home address of the mobile host 199, and "P" and "P'" represent a port.

NAT server 145 reserves one global address G for mobility handling. All mobile User Datagram Protocol (UDP) packets and Transmission Control Protocol (TCP) packets are mapped using the global address G and different port numbers of NAT server 145.

One problem faced in the prior art is the method of to mapping ongoing sessions for mobile host 199, since port numbers for communication are already fixed, which is contrary to the principles behind NAT. The key to solving this problem using home agent 125, since home agent 125 can perform an address translation, instead of using IP tunneling. To facilitate address translation by home agent 125, the open ports on mobile host 199 need to be known by NAT server 145. The open ports are mapped to ports on the outside interface of NAT server 145, whereby home agent 125 is notified of the mapped ports.

Figure 2:
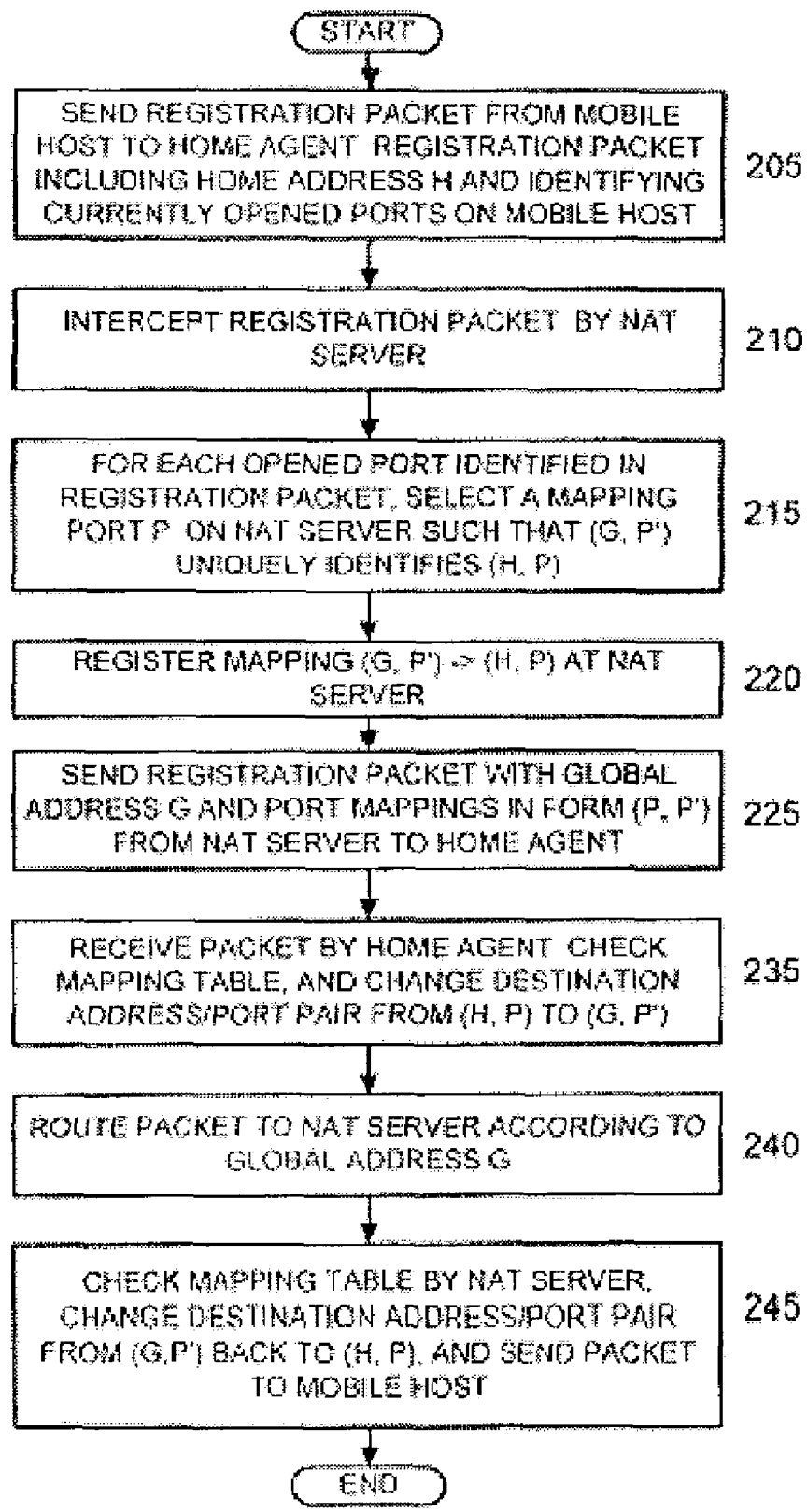
FIG. 2 is a flow diagram illustrating a method for network address/port translation for supporting a mobile host in a wireless communication structure, according to an illustrative embodiment of the present invention.

FIG. 2 is a flow diagram illustrating a method for network address/port translation for supporting a mobile host in a wireless communication structure, according to an illustrative embodiment of the present invention. The method of FIG. 2 corresponds to the case when mobile host 199 moves into the foreign network 140, which employs NAT, and is directly reachable by NAT server 145 of foreign network 140.

Mobile host 199 sends a registration packet to home agent 125 (of mobile host 199), with the home address H of mobile host 199 as the source address (step 205). Besides the normal registration information, the registration packet also includes the currently opened ports P on mobile host 199.

NAT server 145 in foreign network 140 intercepts the registration packet (step 210). For each opened port P in the registration packet, NAT server 145 selects a mapping port P' on NAT server 145 such that (G, P') can uniquely identify (H, P) (step 215). NAT server 145 registers the mapping (G, P')→(H, P) (step 220). NAT server 145 then sends to home agent 125 the registration packet together with the global address G and all port mappings in the form of (P, P') (step 225). NAT server 145 also notes that the home address H of mobile host 199 has been registered.

When a packet from an ongoing session for port P on mobile host 199 is received by home agent 125 of mobile host 199, home agent 125 looks up the mapping table and changes the destination address/port pair in the packet from (H, P) to (G, P') (step 235). The packet is then routed to NAT server 145 in foreign network 140 according to the global address G (step 240). NAT server 145 checks its' mapping table, changes the destination address/port pair back to (H, P) and sends the packet to mobile host 199 (step 245).

Figure 3:
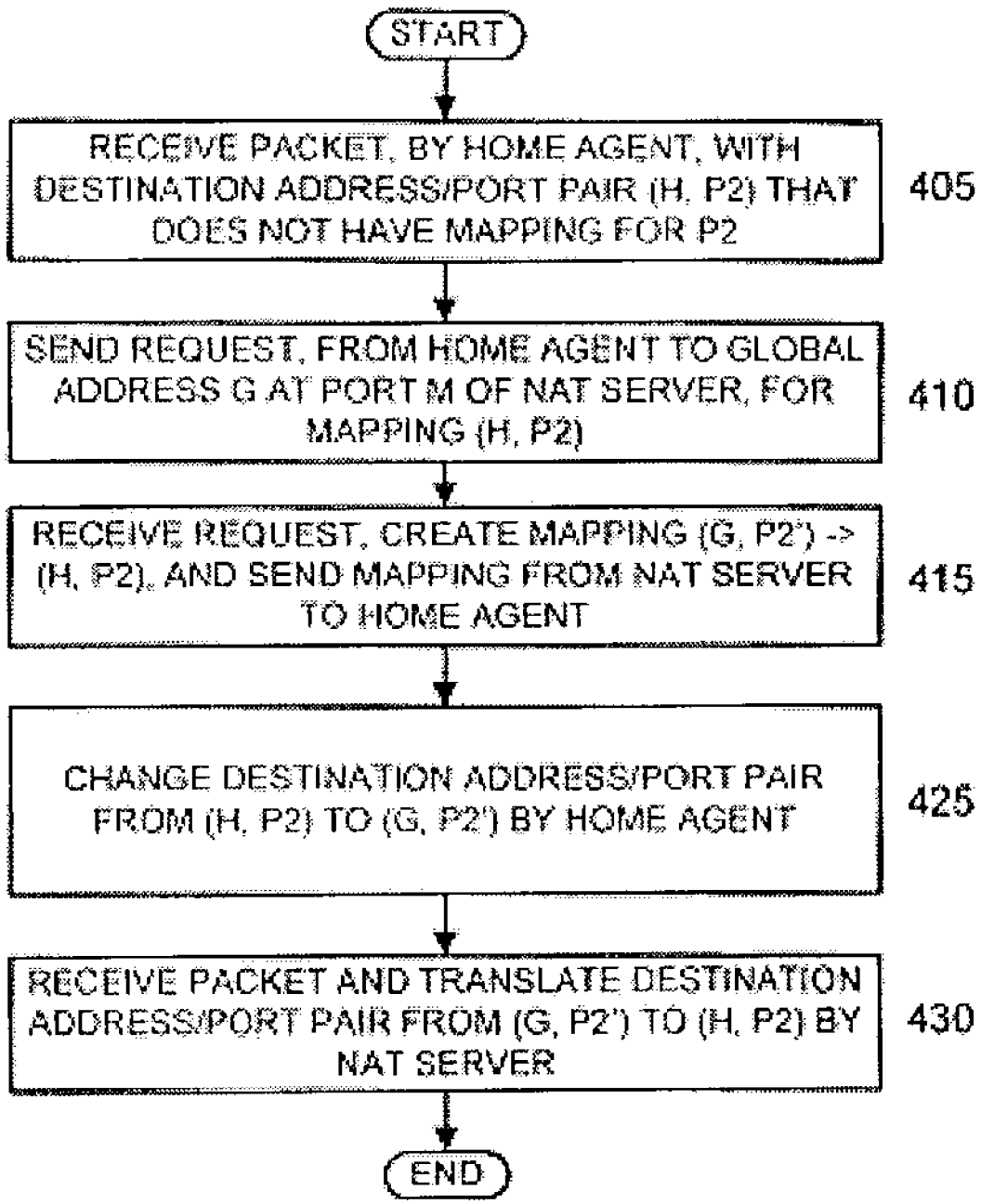
FIG. 3 is a flow diagram illustrating a method for network address/port translation for supporting a mobile host in a wireless communication structure, according to yet another illustrative embodiment of the present invention.
Figure 4:
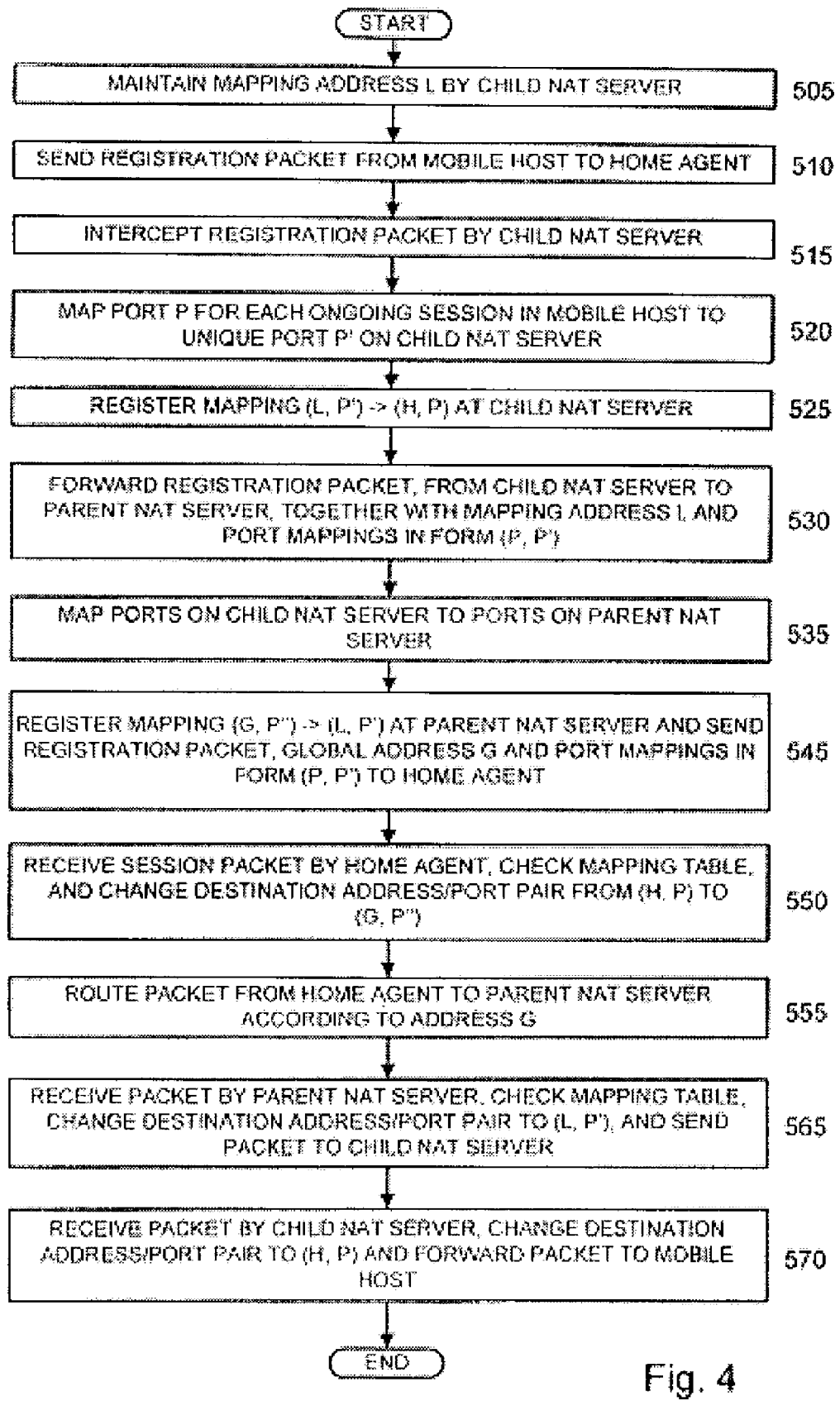
FIG. 4 is a flow diagram illustrating a method for network address/port translation for supporting a mobile host in a wireless communication structure, according to a further illustrative embodiment of the present invention.

It is to be appreciated that FIG. 3 and FIG. 4 utilize some steps as shown in FIG. 2, corresponding to the process of mobile host registration. These steps are not reproduced in FIG. 3 and FIG. 4, as to focus upon the unique aspects of the present invention shown respectively in each figure.

FIG. 3 is a flow diagram illustrating a method for network address/port translation for supporting a mobile host in a wireless communication structure, according to yet another illustrative embodiment of the present invention. The method of FIG. 3 corresponds to the case when home agent 125 receives a packet for mobile host 199 in which the destination port does not have any mapping at home agent 125. This could happen when a new session is initiated by a corresponding host (CH) or mobile host 199 did not send out any currently opened ports during registration (e.g. for backward compatibility, mobile host 199 may be a regular mobile IP host), or the session is started in the foreign network. In such a case, home agent 125 directly asks NAT server 145 in foreign network 140 to create a mapping (step 410). Since home agent 125 only has the mobility address G on NAT server 145 in foreign network 140, creation of a mapping by NAT server 145 requires that a port for this purpose be reserved on global address G by NAT server 145; this port is denoted herein as port M.

Thus, when home agent 125 receives a packet with a destination address (H, $P_2$) and there is no port mapping for $P_2$ (step 405), home agent 125 sends a request for mapping (H, $P_2$) to global address G at port M of NAT server 145 in the foreign network 140 (step 410). NAT server 145, upon receiving this request, creates a mapping (G, $P_2'$)→(H, $P_2$) and sends the mapping (G, $P_2'$)→(H, $P_2$) back to home agent 125 (step 415). Home agent 125 can then replace the destination address/port pair in the packets for mobile host 199 from (H, $P_2$) to (G, $P_2'$) (step 425). When NAT server 145 receives the packet, the destination address/port pair are translated back to (H, $P_2$) (step 430) so that the packet can then be correctly routed to mobile host 199.

FIG. 4 is a flow diagram illustrating a method for network address/port translation for supporting a mobile host in a wireless communication structure, according to a further illustrative embodiment of the present invention. The method of FIG. 4 corresponds to the case when mobile host 199 moves into foreign network 140 (which employs NAT), however, NAT server 145 of foreign network 140 cannot directly reach mobile host 199. Mobile host 199 most likely will be directly attached to a sub-network 190 that is part of the network (here, foreign network 140) served by NAT server 145. One solution to this problem is to employ another hierarchy of NAT, i.e., sub-network 190 would also have a NAT server. In the example of FIG. 4, NAT server 145 of foreign network 140 can be considered to be the parent server (and is hereinafter interchangeably referred to with respect to the example of FIG. 4 as "NAT server" 145 or "parent NAT server" 145) while NAT server of sub-network 190 may be considered to be the child server (and is hereinafter referred to as "child NAT server 195").

Child NAT server 195 follows a similar procedure to that employed by parent NAT server 145 except child NAT server 195 communicates with parent NAT server 145 instead of home agent 125 of mobile host 199. Child NAT server 195 also maintains a mobility mapping address L that is local to child NAT server 195 (step 505). When mobile host 199 sends registration packet to home agent 125 (step 510), child NAT server 195 intercepts the registration packet (step 515). Child NAT server 195 maps the port P for each ongoing session in mobile host 199 to a unique port P'on the mapping address L (i.e., on child NAT server 195) (step 520). A mapping (L, P')→(H, P) is registered at child NAT server 195 (step 525). Child NAT server 195 then forwards the registration packet to parent NAT server 145 together with L and all the port mapping in the form of (P, P') (step 530). Parent NAT server 145 again maps the ports to make them unique on the outside address G, i.e. for each port P' on address L, a mapping (P', P'') is generated (step 535). Parent NAT server 145 registers the mapping (G, P''')→(L, P'), and sends the registration packet, the global address G and the port mappings in the form of (P, P''') to home agent 125 (step 545).

When a packet from an ongoing session for port P on mobile host 199 is received by home agent 125 of mobile host 199, home agent 125 checks its' mapping table and changes the destination address/port pair in the packet from (H, P) to (G, P''') (step 550). The packet is then routed from home agent 125 to NAT server 145 in foreign network 140 according to global address G (step 555). NAT server 145 receives the packet, checks the mapping table, changes the destination address/port pair to (L, P') and sends the packet to child NAT server 195 (step 565). When child NAT server 195 receives the packet, the destination address/port pair is changed to (H, P) and forwarded to mobile host 199 (step 570).

For mobile sessions initiated inside foreign network 140, similar procedures apply. For sessions initiated by a CH for a MH inside foreign network 140, a request from home agent 125 of mobile host 199 for a mapping will be forwarded to child NAT server 195 by parent NAT server 145. Child NAT server 195 creates a mapping (L, $P_2'$)→(H, $P_2$) and notifies parent NAT server 145 about the mapping. Parent NAT server 145 then creates a mapping (G, $P_2'$)→(L, $P_2'$) and sends the mapping (G, $P_2''$)→(H, $P_2$) to home agent 125.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for supporting a mobile host in a communication structure having a home agent, the mobile host being enabled to communicate with a Network Address Translation (NAT) server, the method comprising the steps of:
   translating, by the home agent data in a packet for the mobile host comprising an address and a port on the mobile host into a global address and a port used on the NAT server, respectively; and
   sending the packet from the home agent for modification so that the packet can be routed to the mobile host, wherein the packet is compatible with the NAT server
   transmitting a request, from the home agent, to create a mapping that includes a particular port on the mobile host, when the particular port on the mobile host is not specified in any mappings at the home agent; and
   receiving information corresponding to the mapping which is used in said translating step.

2. The method of claim 1, further comprising the step of receiving, by the home agent, the global address for use on the NAT server prior to said translating step.

3. The method of claim 1, further comprising the step of receiving, by the home agent, mappings between currently opened ports on the mobile host and different ports used on the NAT server.

4. The method of claim 1, further comprising the step of receiving, by the home agent, a registration packet for registering the mobile host with the home agent, the registration packet including the address on the mobile host.

5. The method of claim 1, wherein said sending step sends the packet for conversion of at least one of the global address and the port used on the NAT server back to the address on the mobile host and the port on the mobile host, respectively.

6. An apparatus for supporting a mobile host in a communication structure having a home agent, the mobile host being enabled to communicate with a Network Address Translation (NAT) server, the apparatus comprising:
a translator, disposed at the home agent, for translating data of a packet for the mobile host comprising an address and a port on the mobile host to a global address and a port used on the NAT server, respectively; and
a transmitter, disposed at the home agent, for transmitting the packet for conversion so that the packet can be routed to the mobile host, wherein
wherein said transmitter disposed at the home agent transmits a request to create a mapping that includes a particular port on the mobile host, when the particular port on the mobile host is not specified in any mappings at the home agent; and said apparatus further comprises a receiver for receiving the mapping for use by said translator.

7. The apparatus of claim 6, further comprising a receiver, disposed at the home agent, for receiving the global address used on the NAT server.

8. The apparatus of claim 6, further comprising a receiver, disposed at the home agent, for receiving mappings between currently opened ports on the mobile host and ports used on the NAT server.

9. The apparatus of claim 6, further comprising a receiver, disposed at the home agent, for receiving a registration packet for registering the mobile host with the home agent, the registration packet including the address used on the mobile host.

10. The apparatus of claim 6, wherein said transmitter disposed at the home agent transmits the packet for conversion of at least one of the global address and the port used on the NAT server back to the address on the mobile host and the port on the mobile host, respectively.

11. A method for enabling a Network Address Translation (NAT) server to perform address-related translation for a mobile host corresponding to a communication structure having a home agent, the NAT server being enabled to communicate with the mobile host, the method comprising the steps of:
receiving, by the NAT server, a packet for use by the mobile host having an address and a port used on the mobile host translated to a global address on the NAT server and a port on the NAT server, respectively; and
modifying at least one of the global address on the NAT server and the port on the NAT server, so that the packet can be routed to the mobile host
receiving a request, by the NAT server, to create a mapping that includes a particular port on the mobile host, when the particular port used on the mobile host is not specified in any mappings at the home agent.

12. The method of claim 11, further comprising the step of sending, from the NAT server, the global address on the NAT server for translation of the at least one of the address and the port used on the mobile host to the global address and the port on the NAT server, respectively.

13. The method of claim 11, further comprising the step of sending, from the NAT server, mappings between currently opened ports used on the mobile host and ports on the NAT server.

14. The method of claim 11, further comprising the step of sending, from the NAT server, a registration packet for registering the mobile host with the home agent, the registration packet including the address used on the mobile host.

15. The method of claim 11, wherein said modifying step comprises the steps of converting at least one of the global address and the port on the NAT server back to the address and the port on the mobile host, respectively.

16. An apparatus for enabling a Network Address Translation (NAT) server to perform address-related translation for a mobile host corresponding to a communication structure having a home agent, the apparatus comprising:
a receiver, disposed at the NAT server, for receiving a packet for the mobile host having at least one of an address and a port used for the mobile host translated to a global address and a port on the NAT server, respectively; and
a translator, disposed at the NAT server, for translating at least one of the global address and the port on the NAT server, so that the packet can be routed to the mobile host
wherein said receiver disposed at the NAT server is capable of receiving a request to create a mapping that includes a particular port used for the mobile host, when the particular port on the mobile host is not specified in any mappings at the home agent.

17. The apparatus of claim 16, further comprising a transmitter, disposed at the NAT server, for transmitting the global address on the NAT server for translation of the at least one of the address and the port on the mobile host to the global address and the port used on the NAT server, respectively.

18. The apparatus of claim 16, further comprising a transmitter, disposed at the NAT server, for transmitting mappings between currently opened ports used on the mobile host and different ports on the NAT server.

19. The apparatus of claim 16, further comprising a transmitter, disposed at the NAT server, for transmitting a registration packet for registering the mobile host with the home agent, the registration packet including the address on the mobile host.

20. The apparatus of claim 16, wherein said translator translates at least one of the global address and the port on the NAT server back to the address and the port used for the mobile host, respectively.

* * * * *